(12) United States Patent
Greiner et al.

(10) Patent No.: US 7,022,423 B2
(45) Date of Patent: * Apr. 4, 2006

(54) SEALED CONTACT BUSHINGS

(75) Inventors: Robert Greiner, Baiersdorf (DE); Manfred Ochsenkuehn, Berg (DE); Angelo Polese, Falkensee (DE)

(73) Assignee: SIEMENS Aktiengesellschaft, Munich (DE)

( * ) Notice: Subject to any disclaimer, the term of this patent is extended or adjusted under 35 U.S.C. 154(b) by 54 days.

This patent is subject to a terminal disclaimer.

(21) Appl. No.: 10/149,907

(22) PCT Filed: Dec. 14, 2000

(86) PCT No.: PCT/DE00/04463

§ 371 (c)(1),
(2), (4) Date: Oct. 9, 2002

(87) PCT Pub. No.: WO01/44361

PCT Pub. Date: Jun. 21, 2001

(65) Prior Publication Data

US 2003/0138638 A1    Jul. 24, 2003

(30) Foreign Application Priority Data

Dec. 15, 1999    (DE) ................................ 199 60 549

(51) Int. Cl.
*B32B 9/00*    (2006.01)
*C08K 3/40*    (2006.01)

(52) U.S. Cl. ...................... 428/702; 428/426; 501/41; 501/123; 501/152; 423/305; 524/494

(58) Field of Classification Search ................ 428/426, 428/704, 702; 501/45, 41, 123, 152; 524/494, 524/492; 523/466, 451, 514, 515; 423/305, 423/309

See application file for complete search history.

(56) References Cited

U.S. PATENT DOCUMENTS 5,043,369 A * 8/1991 Bahn et al. ................ 523/466
5,328,874 A * 7/1994 Beall et al.

FOREIGN PATENT DOCUMENTS

| EP | 0 365 236 A | 4/1990 |
| EP | 0 773 196 A | 5/1997 |
| JP | 10 101364 A | 4/1998 |

OTHER PUBLICATIONS

J. Komander, "Hart und Weich Nacheinander," *Kunststroffe*, V. 88, 1998, p. 207-208.

* cited by examiner

*Primary Examiner*—Deborah Jones
*Assistant Examiner*—G. Blackwell
(74) *Attorney, Agent, or Firm*—Young & Thompson

(57) ABSTRACT

According to the invention, the inventive sealed contact bushings for plastic components consist of a glass/plastic compound based on a thermoplastic, which contains a low-melting sulphophosphate glass with the following composition: 4 to 10% $Li_2O$, 40 to 10% $Na_2O$ 4 to 8% $K_2O$, 1 to 2 % CaO, 35 to 37% ZnO, 0 to 3% $La_2O_3$, 19 to 22% $P_2O_5$ and 19 to 22% $SO_3$, in addition to a high-performance thermoplastic.

17 Claims, No Drawings

SEALED CONTACT BUSHINGS

The invention relates to media-tight contact bushings in plastic components.

Various materials have been used to date for media-tight contact bushings in housings and casings of electrical and electronic components, such as plug connectors, sensors, optoelectronic components and relays. Thus, for example, a thermoplastic material generally serves for shaping while a thermosetting material is used in a subsequent encapsulation process in order to achieve the required tightness and also the heat resistance of the shaped article.

A further possibility consists in the use of thermoplastic "hard-soft systems" which are produced, for example, by a two-component injection molding technique. In this technique, the functional surfaces, for example housings, are produced with the "hard component" while the "soft component", which, for example, is a thermoplastic elastomer, performs the sealing function according to the O-ring principle (cf. for example: "Kunststoffe [Plastics]", Vol. 88 (1998), pages 207 and 208). Furthermore, attempts have also been made to achieve a sealing function by applying adhesion promoters to the metallic bushings or by activating the plastic or metal surfaces, for example by a plasma treatment.

The disadvantage of these procedures is the complicated process owing to the large number of process steps. In addition, the use of different materials results in a not inconsiderable range of types, which gives rise to high costs for the material, for example in procurement and storage, and for disposal.

In spite of the considerable complexity, however, often only inadequate results are obtained with regard to tightness.

It is an object of the invention to design media-tight contact bushings in plastic components in such a way that the tightness is ensured and that they can be produced in a simple manner and economically.

This is achieved, according to the invention, by contact bushings which consist of a thermoplastic-based glass/plastic compound which contains a low-melting sulfophosphate glass of the following composition (in mol %): 4 to 10% of $Li_2O$, 4 to 10% of $Na_2O$, 4 to 8% of $K_2O$, 1 to 2% of CaO, 35 to 37% of ZnO, 0 to 3% of $La_2O_3$, 19 to 22% of $P_2O_5$ and 19 to 22% of $SO_3$, and a high-performance thermoplastic.

By using the special glass/plastic compound comprising a low-melting sulfophosphate glass and a high-performance thermoplastic, a material-tight joint is achieved between the contact bushings and the compound and hence a media-tight joint is produced. It is advantageous that this is effected in a single operation. Owing to the fact that the compound, i.e. both the glass and the plastic, is present in the molten state at the processing temperature, good wetting of the metal contact by the glass phase takes place and pronounced adhesive bonding of the glass to the contact bushings occurs.

The glass melt differs from the solidified glass also in the characteristics of its surface. While the active polar terminal groups of solidified glass are saturated, for example, with hydroxyl groups of the water always present in the surrounding air and hence lose their activity, the free and active terminal groups are still present in the glass melt and interact with the metal surface and/or plastic surface in contact with, for example, metal or plastic and thus result in good wetting and/or bonding to these.

The "low-melting" sulfophosphate glass is understood as meaning a glass having a low glass transition temperature $T_g$, in particular a glass having $T_g$<about 500° C. A "high-performance thermoplastic" is a high-performance polymer, in the present case a heat-resistant polymer or high-temperature resistant polymer. This is important because both the temperature during the production of the compound and the processing temperature (of the compound) are >300° C.

The sulfophosphate glass contained in the glass/plastic compound has a glass transition temperature in the range from 250 to 280° C.; at the processing temperature, it is therefore in the flowable state. Preferably, the compound comprises a sulfophosphate glass of the following composition (in mol %): 4.9% of $Li_2O$, 9.4% of $Na_2O$, 7.1% of $K_2O$, 1.6% of CaO, 36.6% of ZnO, 20.0% of $P_2O_5$ and 20.4% of $SO_3$. Such a glass has a glass transition temperature of 268° C. Another glass has, for example, the following composition (in mol %): 9% of $Li_2O$, 5% of $Na_2O$, 7% of $K_2O$, 1.6% of CaO, 37% of ZnO, 20.4% of $P_2O_5$ and 20% of $SO_3$ ($T_g$=280° C.). A further glass has, for example, the following composition (in mol %): 4.8% of $Li_2O$, 9.2% of $Na_2O$, 6.9% of $K_2O$, 1.6% of CaO, 35.9% of ZnO, 2.0% of $La_2O_3$, 19.6% of $P_2O_5$ and 20.0% of $SO_3$ ($T_g$=275° C.).

The glass/plastic compound contains, as the high-performance thermoplastic, preferably one of the following polymers: a polyetheretherketone (PEEK), a polyetherimide (PEI), a polyphenylene sulfide (PPS), a partly aromatic polyamide, such as polyphthalamide (PPA), or a liquid crystalline polymer (LCP). In the case of these polymers, the glass transition temperature of the glass component is adapted to the processing temperature of the thermoplastic material. Further high-performance thermoplastics which may be used are polyaryletherketones (PAEK) generally, for example polyetherketones (PEK), and polysulfones (PSU), in particular polyethersulfones (PES) and polyphenylene sulfones (PPSU).

The proportion of the compound in the glass component, i.e. in the sulfophosphate glass, is in general 15 to 80% by weight, preferably 25 to 60% by weight. The processing temperature of the compound is about 320 to 420° C. In spite of the high proportion of glass, the compound has high flowability, so that complicated and delicate components having contact bushings can also be realized therewith.

The production of the glass/plastic compound is advantageously effected, for example, by first producing—at elevated temperature (preferably about 320 to 420° C.)—a masterbatch having a glass content of 60 to 90% by weight from the two components, i.e. sulfophosphate glass and high-performance thermoplastic. It was surprisingly found that, with the use of glass particles having a diameter of ≦1.5 mm in the masterbatch, glass structures in the μm and sub-μm range which are uniformly distributed are obtained.

Further processing is then effected in a manner such that the glass content is reduced, for example to 25 to 60% by weight, by adding further high-performance thermoplastic to the masterbatch—at elevated temperature (preferably about 320 to 420° C.). The structure and the homogeneous distribution of the glass particles are not influenced thereby, i.e. they are retained. In control experiments, it was surprisingly found that structure size and structure distribution of the type described are not obtained starting directly from a batch containing, for example, 15% of glass.

Rather, uniformly distributed glass structures, even in the nm range, can be realized only starting from a masterbatch having a high proportion of special sulfophosphate glass in a high-performance thermoplastic.

As already mentioned, the compound is in the flowable state at the processing temperature. As a result of the melting process during processing, a new, virgin glass surface which has high reactivity is constantly produced. The molten compound or the molten glass exhibits extremely good adhesion to the contact bushings and—during the original shaping of the component (by injection molding)—a material-tight joint forms between bushing and compound and is also retained after cooling of the component. This compound moreover has outstanding resistance to thermal shocks.

Since, in the case of the contact bushings according to the invention, the media-tight bond is produced during injection molding (original shaping) of the components, manufacturing steps are saved. Moreover, no pretreatments and aftertreatments are required and the number of materials used is reduced to a single material, resulting in not inconsiderable cost savings. In addition—in a subsequent operation—connections can be tightly fused in and positioned or directly coated bushings can be subsequently adjusted without the tightness being influenced.

The media-tight contact bushings according to the invention are used in particular in housings and casings of the following electrical or electronic components: plug connectors, sensors, optoelectronic components, relays, pin bushings in relay base elements and lead frames.

The invention is to be explained in more detail with reference to embodiments. The sulfophosphate glass used in the investigations has the following composition (in mol %): 4.9% of $Li_2O$, 9.4% of $Na_2O$, 7.1% of $K_2O$, 1.6% of CaO, 36.6% of ZnO, 20.0% of $P_2O_5$ and 20.4% of $SO_3$.

EXAMPLE 1

The tightness is tested on test bodies which consist of a coated metal insert part. The test bodies having a coating comprising a glass/plastic compound based on polyphenylene sulfide with a content of 60% by weight of sulfophosphate glass ("PPS+SPG60") or comprising a commercial polyphenylene sulfide with 40% by weight of glass fibers ("PPS+GF40") or comprising a commercial polyphthalamide with 33% by weight of glass fibers ("PPA+GF33") which is already optimized by the manufacturer with respect to adhesion to metal are compared.

The test bodies in which the insert part consists of silver-plated copper are produced under the following conditions:

| | |
|---|---|
| Preheating temperature of insert part: | 160° C. |
| Mold temperature: | 150° C. |
| Melt temperature PPS + SPG60: | 335° C. |
| Melt temperature PPS + GF40: | 330° C. |
| Melt temperature PPA + GF33: | 335° C. |

For the test, the test bodies are installed in a pressure apparatus and subjected to superatmospheric pressure. The pressure transmission and test medium used is water.

| Testing is carried out according to the following program: | |
|---|---|
| Test 1: | 24 h after production of the sample body<br>3 min at 1 bar, then pressure increase for 3 min at 2 bar |
| Dunk test: | 140° C. 30 min→ice water 2 min (5 cycles) |
| Test 2: | After dunk test 5 cycles<br>3 min at 1 bar, then pressure increase for 3 min at 2 bar |
| Dunk test: | 140° C. 30 min→ice water 2 min (5 cycles) |
| Test 3: | After dunk test 10 cycles<br>3 min at 1 bar, then pressure increase for 3 min at 2 bar |
| Test 4: | Further pressure increase in 1 bar steps<br>3 min at 3 bar, 3 min at 4 bar . . . 3 min at 10 bar |
| (end) | |

The results of the tightness test are summarized in the table below. It is found that substantially better tightness of plastic/metal composite systems is achieved in a single processing step using the glass/plastic compounds according to the invention (t=tight, l=leaking).

EXAMPLE 2

Lead frame strips (strip material: silver-plated copper) are coated with a glass/plastic compound based on polyphenylene sulfide having a content of 40% by weight of sulfophosphate glass ("PPS+SPG40"). The experiments are carried out on a series mold under series conditions:

| | |
|---|---|
| Preheating temperature of lead frame strip: | 190° C. |
| Mold temperature: | 190° C. |
| Melt temperature PPS + SPG40: | 330° C. |

For the tightness test, creep liquid is applied to the coated strips (standard test). No penetration of creep liquid into the interface between lead frame strip and coating was observable. This constitutes a substantial improvement in comparison with the materials PPS+GF40 and PPA+GF33.

EXAMPLE 3

In the case of the pin bushing in a relay base element (pin material: copper), a glass/plastic compound based on polyphenylene sulfide having a content of 40% by weight of sulfophosphate ("PPS+SPG40") serves as the base element. The experiments are carried out on a series mold under series conditions:

Mold temperature: 150° C.

Melt temperature PPS+SPG40: 335° C.

The tightness test is effected as a reduced pressure test in a standard test apparatus. Under standard conditions, no drop in the applied reduced pressure was found. In the case of the currently used materials for the relay base element, on the other hand, subsequent encapsulation of the component (with a thermosetting casting resin) is necessary in order to ensure the required tightness of the pin bushing in the standard test.

| Test body | Pressure in bar | No. | Test 1 | | Dunk test | Test 2 | | Dunk test | Test 3 | | | | | Test 4 | | | | | |
|---|---|---|---|---|---|---|---|---|---|---|---|---|---|---|---|---|---|---|---|
| | | | 1 | 2 | | 1 | 2 | | 1 | 2 | 3 | 4 | 5 | 6 | 7 | 8 | 9 | 10 | |
| PPS + GF40 | | 1 | 1 | — | | — | — | | — | — | — | — | — | — | — | — | — | — | |
| | | 2 | 1 | — | | — | — | | — | — | — | — | — | — | — | — | — | — | |
| | | 3 | 1 | — | | — | — | | — | — | — | — | — | — | — | — | — | — | |
| | | 4 | 1 | — | | — | — | | — | — | — | — | — | — | — | — | — | — | |
| | | 5 | 1 | — | | — | — | | — | — | — | — | — | — | — | — | — | — | |
| PPA + GF33 | | 1 | 1 | — | | — | — | | — | — | — | — | — | — | — | — | — | — | |
| | | 2 | t | 1 | | — | — | | — | — | — | — | — | — | — | — | — | — | |
| | | 3 | t | t | x | 1 | — | | — | — | — | — | — | — | — | — | — | — | |
| | | 4 | t | 1 | | — | — | | — | — | — | — | — | — | — | — | — | — | |
| | | 5 | 1 | — | | — | — | | — | — | — | — | — | — | — | — | — | — | |
| PPS + SPG60 | | 1 | t | t | x | t | t | x | t | t | t | t | 1 | — | — | — | — | — | |
| | | 2 | t | t | x | t | t | x | t | t | t | t | t | t | t | t | t | | |
| | | 3 | t | t | x | t | t | x | t | t | t | t | t | t | t | t | t | | |
| | | 4 | t | t | x | t | t | x | t | t | t | t | t | t | t | t | t | | |
| | | 5 | t | t | x | t | t | x | t | t | t | 1 | — | — | — | — | — | | |

The invention claimed is:

1. A plastic component, comprising a media-tight contact bushing, wherein said media-tight contact bushing comprises a thermoplastic-based glass/plastic compound containing:
   a low-melting sulfophosphate glass of the following composition: 4 to 10% of $Li_2O$, 4 to 10% of $Na_2O$, 4 to 8% of $K_2O$, 1 to 2% of CaO, 35 to 37% of ZnO, 0 to 3% of $La_2O_3$, 19 to 22% of $P_2O_5$ and 19 to 22% of $SO_3$, and a high-performance thermoplastic;
   and wherein said media-tight contact bushing has a uniformly distributed glass structure in the μm and sub-μm range.

2. The plastic component as claimed in claim 1, wherein the compound contains a sulfophosphate glass of the following composition: 4.9% of $Li_2O$, 9.4% of $Na_2O$, 7.1% of $K_2O$, 1.6% of CaO, 36.6% of ZnO, 20.0% of $P_2O_5$ and 20.4% of $SO_3$.

3. The plastic component as claimed in claim 1, wherein the high-performance thermoplastic is selected from the group consisting of a polyetheretherketone, a polyetherimide, a polyphenylene sulfide, a partly aromatic polyamide, and a liquid crystalline polymer.

4. The plastic component as claimed in claim 1, wherein the proportion of the compound in sulfophosphate glass is 15 to 80% by weight.

5. A process for the production of a plastic component as claimed in claim 1, wherein a media-tight bond is produced during the injection molding of the components.

6. The process as claimed in claim 5, wherein a relay, a sensor, a plug connector, an optoelectronic component and/or a pin bushing in a relay base element and/or a lead frame is produced.

7. The plastic component as claimed in claim 1, wherein said high-performance thermoplastic comprises a polymer selected from the group consisting of a polyetheretherketone, a polyetherimide, a polyphenylene sulfide, a partly aromatic polyamide, and a liquid crystalline polymer in combination with a polyaryletherketone.

8. A plastic component comprising a media-tight contact bushing, wherein said media-tight contact bushing comprises a thermoplastic-based glass/plastic compound comprising:
   a low-melting sulfophosphate glass of the following composition: 4 to 10% of $Li_2O$, 4 to 10% of $Na_2O$, 4 to 8% of $K_2O$, 1 to 2% of CaO, 35 to 37% of ZnO, 0 to 3% of $La_2O_3$, 19 to 22% of $P_2O_5$ and 19 to 22% of $SO_3$, and a high-performance thermoplastic;
   wherein the sulfophosphate glass is 25% to 60% by weight of said thermoplastic-based glass/plastic compound;
   and wherein said media-tight contact bushing has a uniformly distributed glass structure in the μm and sub-μm range.

9. The plastic component as claimed in claim 8, wherein the compound contains a sulfophosphate glass of the following composition: 4.9% of $Li_2O$, 9.4% of $Na_2O$, 7.1% of $K_2O$, 1.6% of CaO, 36.6% of ZnO, 20.0% of $P_2O_5$ and 20.4% of $SO_3$.

10. The plastic component as claimed in claim 8, wherein the high-performance thermoplastic is selected from the group consisting of a polyetheretherketone, a polyetherimide, a polyphenylene sulfide, a partly aromatic polyamide, and a liquid crystalline polymer.

11. The plastic component as claimed in claim 8, wherein the thermoplastic comprises a polyaryletherketone.

12. The plastic component as claimed in claim 8, wherein the thermoplastic comprises a polyetherimide.

13. A process for the production of a plastic component as claimed in claim 8, wherein a media-tight bond is produced during the injection molding of the components.

14. A media-tight contact bushing comprising a thermoplastic-based glass/plastic compound which contains:
   a low-melting sulfophosphate glass of the following composition: 4 to 10% of $Li_2O$, 4 to 10% of $Na_2O$, 4 to 8% of $K_2O$, 1 to 2% of CaO, 35 to 37% of ZnO, 0 to 3% of $La_2O_3$, 19 to 22% of $P_2O_5$ and 19 to 22% of $SO_3$, and a high-performance thermoplastic,
   wherein a material-tight joint exists between the contact bushings and the compound, and wherein said media-tight contact bushing has a uniformly distributed glass structure in the μm and sub-μm range.

15. The contact bushing as claimed in claim 14, wherein the compound contains a sulfophosphate glass of the following composition: 4.9% of $Li_2O$, 9.4% of $Na_2O$, 7.1% of $K_2O$, 1.6% of CaO, 36.6% of ZnO, 20.0% of $P_2O_5$ and 20.4% of $SO_3$.

16. The contact bushing as claimed in claim 14, wherein the high-performance thermoplastic is selected from the group consisting of a polyetheretherketone, a polyetherimide, a polyphenylene sulfide, a partly aromatic polyamide, and a liquid crystalline polymer.

17. The contact bushing as claimed in claim 14, wherein said high-performance thermoplastic comprises a polymer selected from the group consisting of a polyetheretherketone, a polyetherimide, a polyphenylene sulfide, a partly aromatic polyamide, and a liquid crystalline polymer in combination with a polyaryletherketone.

* * * * *